US012181803B2

(12) United States Patent
Uchida

(10) Patent No.: US 12,181,803 B2

(45) Date of Patent: Dec. 31, 2024

(54) IMAGE FORMING APPARATUS, IMAGE FORMING METHOD, AND IMAGE FORMING PROGRAM

(71) Applicant: KONICA MINOLTA, INC., Tokyo (JP)

(72) Inventor: Yuji Uchida, Tachikawa (JP)

(73) Assignee: KONICA MINOLTA, INC., Tokyo (JP)

(*) Notice: Subject to any disclaimer, the term of this patent is extended or adjusted under 35 U.S.C. 154(b) by 163 days.

(21) Appl. No.: 18/162,100

(22) Filed: Jan. 31, 2023

(65) Prior Publication Data

US 2023/0288831 A1 Sep. 14, 2023

(30) Foreign Application Priority Data

Mar. 14, 2022 (JP) ................................ 2022-039225

(51) Int. Cl.
*G03G 15/01* (2006.01)
*G03G 15/00* (2006.01)

(52) U.S. Cl.
CPC ..... *G03G 15/0157* (2013.01); *G03G 15/0189* (2013.01); *G03G 15/5045* (2013.01); *G03G 15/6517* (2013.01); *G03G 15/6564* (2013.01); *G03G 15/6588* (2013.01); *G03G 2215/00772* (2013.01); *G03G 2215/0426* (2013.01); *G03G 2215/047* (2013.01)

(58) Field of Classification Search
CPC ......... G03G 2215/047; G03G 15/0189; G03G 15/6517; G03G 15/6564; G03G 2215/00772; G03G 2215/0426
See application file for complete search history.

(56) References Cited

U.S. PATENT DOCUMENTS

| | | | | |
|---|---|---|---|---|
| 7,647,015 B2 * | 1/2010 | Kubota | .............. | G03G 15/0194 399/301 |
| 2017/0052493 A1 * | 2/2017 | Ikeda | ................ | G03G 15/6517 |
| 2019/0068802 A1 * | 2/2019 | Uchida | .............. | H04N 1/00167 |
| 2023/0080058 A1 * | 3/2023 | Uchida | .............. | G03G 15/5054 399/28 |

FOREIGN PATENT DOCUMENTS

| | | |
|---|---|---|
| JP | 2011022439 A | 2/2011 |
| JP | 2015079159 A | 4/2015 |

* cited by examiner

*Primary Examiner* — Ryan D Walsh
(74) *Attorney, Agent, or Firm* — Buchanan Ingersoll & Rooney PC

(57) ABSTRACT

An image forming apparatus includes an image former that forms a color image by superimposing images of respective colors formed on respective different photoconductors on an intermediate transfer body, the image former continuously forming color images of pages on one continuous paper, and the image forming apparatus includes: a first hardware processor that performs job management for each color and generates print job data in which a margin region having a first width is set on an upstream or a downstream in a sheet passing direction of an image forming region of each page; a second hardware processor that detects a color shift amount of each color of the image forming region; and a third hardware processor that corrects a formation position of the image forming region to be a print target page next on the print job data for a color in which a color shift has occurred.

13 Claims, 14 Drawing Sheets

IMAGE FORMING APPARATUS, IMAGE FORMING METHOD, AND IMAGE FORMING PROGRAM

The entire disclosure of Japanese patent Application No. 2022-039225, filed on Mar. 14, 2022, is incorporated herein by reference in its entirety.

BACKGROUND

Technological Field

The present disclosure relates to an image forming apparatus, an image forming method, and an image forming program.

Description of the Related Art

Conventionally, an image forming apparatus that forms a color image is known. Such an image forming apparatus includes four image forming units for forming toner images of respective colors of yellow (Y), magenta (M), cyan (C), and black (K). In each image forming unit, a photoconductor is charged, and a charge is erased, that is, what is called exposure is performed in accordance with a document image to form an electrostatic latent image on the photoconductor. Then, toner is attached to the electrostatic latent image of the photoconductor using a developing unit to form a toner image on the photoconductor. Then, the toner image attached to the photoconductor of each image forming unit is primarily transferred to an intermediate transfer belt, for example, and then secondarily transferred from an intermediate transfer belt to the sheet.

In this type of image forming apparatus, a color shift may occur when toner images of respective colors are superimposed due to a change in a driving roller diameter of the intermediate transfer belt due to an increase in internal temperature at the time of image forming operation and a change in the speed of the intermediate transfer belt over time. Thus, in the image forming apparatus, color resist correction is periodically performed to correct color shift (see, for example, Japanese Patent Application Laid-Open No. 2011-022439 and Japanese Patent Application Laid-Open No. 2015-079159).

FIG. 1 is a diagram schematically illustrating color shift occurring at a time of color image formation. FIGS. 2A, 2B, and 2C are diagrams schematically illustrating color resist correction according to the prior art.

FIG. 1 illustrates a state in which the internal temperature rises due to heat or the like of a fixing device, and driving rollers 423 that stretch an intermediate transfer belt 421 expand as a representative color shift factor. At this time, due to the expansion of the driving rollers 423, the length of the intermediate transfer belt 421 increases, and the rotation speed of the intermediate transfer belt 421 fluctuates. As a result, the time during which the intermediate transfer belt 421 passes between photoconductor drums 413 of the respective colors fluctuates, and color shift (meaning positional shift between colors, the same applies hereinafter) in a sheet passing direction occurs. Note that the degree of such color shift depends on the internal temperature, and thus varies with time.

As a means for performing color resist correction, for example, as illustrated in FIGS. 2A, 2B, and 2C, a method is known in which color shift measurement patches are simultaneously printed on the intermediate transfer belt 421 in all colors, the color shift measurement patches are read by a sensor (for example, a photosensor) 430 disposed to face the intermediate transfer belt 421 to calculate a color shift amount of each color (that is, a difference in time during which each color region formed on the intermediate transfer belt 421 passes by the sensor 430), and feedback (correction) is performed to image formation. Note that, for example, as illustrated in FIG. 2C, the color resist correction is performed by adjusting an image forming timing according to the color shift amount.

Incidentally, in this type of image forming apparatus, normally, in a case where an image is formed on each sheet (paper sheet), for example, printing is temporarily stopped at a timing when a certain number of sheets are printed or at a timing when a change in internal temperature occurs, and color shift measurement and feedback are performed.

However, for example, in a case where an image is formed on a long sheet such as roll paper (hereinafter referred to as a "continuous paper"), it is necessary to form an image on the continuous paper without a gap. FIG. 3 is a diagram illustrating an example of a mode in which an image is formed on the continuous paper P. FIG. 3 illustrates a mode in which the continuous paper P is divided in units of pages (P1, P2, P3 . . . , or the like), and a label image is formed within each page of the continuous paper P.

That is, in the method of periodically stopping printing and performing color resist correction as in the prior art, for example, in a case of a print job of 1000 meters, color resist correction cannot be performed for 1000 meters, and in the latter half of the print job, color shift may occur due to temperature change inside the apparatus.

The inventors of the present application have studied application of color resist correction called two-dimensional position correction as a means to cope with such a problem.

FIGS. 4A and 4B are diagrams schematically illustrating two-dimensional position correction. FIG. 4A illustrates a print job when the two-dimensional position correction is not applied, and FIG. 4B illustrates a print job when the two-dimensional position correction is applied.

Normally, as illustrated in FIG. 4A, in the print job data, an image forming region (this means a region where an image to be printed is formed, the same applies hereinafter) and image contents to be printed (that is, the image content as a print target) in the image forming region are set for each page. In this regard, in the two-dimensional position correction, as illustrated in FIG. 4B, for each page, in addition to the image forming region, data in which a margin region (that is, a blank region) is added on an upstream side and/or a downstream side in the sheet passing direction with respect to the image forming region is generated as print job data. That is, in the two-dimensional position correction, the printing target region of each page is extended by the margin region in addition to the image forming region.

In the two-dimensional position correction, the color shift amount of each color is detected before the print job is executed, and according to the color shift amount of a color in which the color shift has occurred, the image forming region of the color is moved in parallel within the margin region. Thus, the image forming timing of each color at the time of executing the print job is adjusted, so that images of respective colors overlap on the intermediate transfer belt. FIG. 4B illustrates a state in which the image forming region of Y color and the image forming region of K color are superimposed on the intermediate transfer belt by moving the image forming region of Y color in parallel within the margin region on the print job because the color shift has occurred in the image forming region of Y color.

In this two-dimensional position correction, it is sufficient to change the image forming region for each color on the memory by image processing, and thus independent processing can be performed for each page. That is, according to the two-dimensional position correction, the color shift amount is detected during execution of the print job and fed back to image formation, so that it is possible to flexibly cope with a case where the color shift amount temporally varies.

However, in this two-dimensional position correction, it is necessary to provide an extra margin region, and a gap corresponding to the margin region of each page occurs between images in the sheet. In particular, when printing is continued without a gap on the continuous paper, the color shift in the sheet passing direction is accumulated (described later with reference to FIG. 9). Therefore, when the above-described two-dimensional position correction is simply applied to the continuous paper, it is necessary to set the margin region of each page to be considerably large in order to cope with the color shift.

In general, printing on continuous paper requires a margin between pages (that is, between images) to be a minimized constant interval, and in consideration of such a requirement, the above-described two-dimensional position correction for setting an excessively large margin region lacks practicality.

SUMMARY

The present disclosure has been made in view of the above problems, and an object thereof is to provide an image forming apparatus, an image forming method, and an image forming program capable of correcting a color shift occurring during continuous printing, without widening a margin between pages when printing is executed on continuous paper.

To achieve the abovementioned object, according to an aspect of the present invention, there is provided an image forming apparatus including an image former that forms a color image by superimposing images of respective colors formed on respective different photoconductors on an intermediate transfer body, the image former continuously forming color images of a plurality of pages on one continuous paper, and the image forming apparatus reflecting one aspect of the present invention comprises: a first hardware processor that performs job management for each color and generates print job data in which a margin region having a first width is set on an upstream side or a downstream side in a sheet passing direction of an image forming region of each page; a second hardware processor that detects, in units of pages, a color shift amount of each color of the image forming region generated while printing related to the print job data is performed; and a third hardware processor that corrects a formation position of the image forming region to be a print target page next on the print job data for a color in which a color shift has occurred based on the color shift amount in a verification target page one or a plurality of pages before when printing related to the print job data is performed, wherein the third hardware processor includes a first correction processor that compensates for at least a part of the color shift amount by moving a formation position of the image forming region within the print target page in parallel in the sheet passing direction within a range of the margin region in a job of a color to be corrected of the print job data, and a second correction processor that compensates for at least a part of the color shift amount by inserting an additional blank region having a second width that does not constitute a page between the print target page and an immediately preceding page in the job of the color to be corrected of the print job data, and an entirety of the color shift amount is compensated by processing of the first correction processor and the second correction processor.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
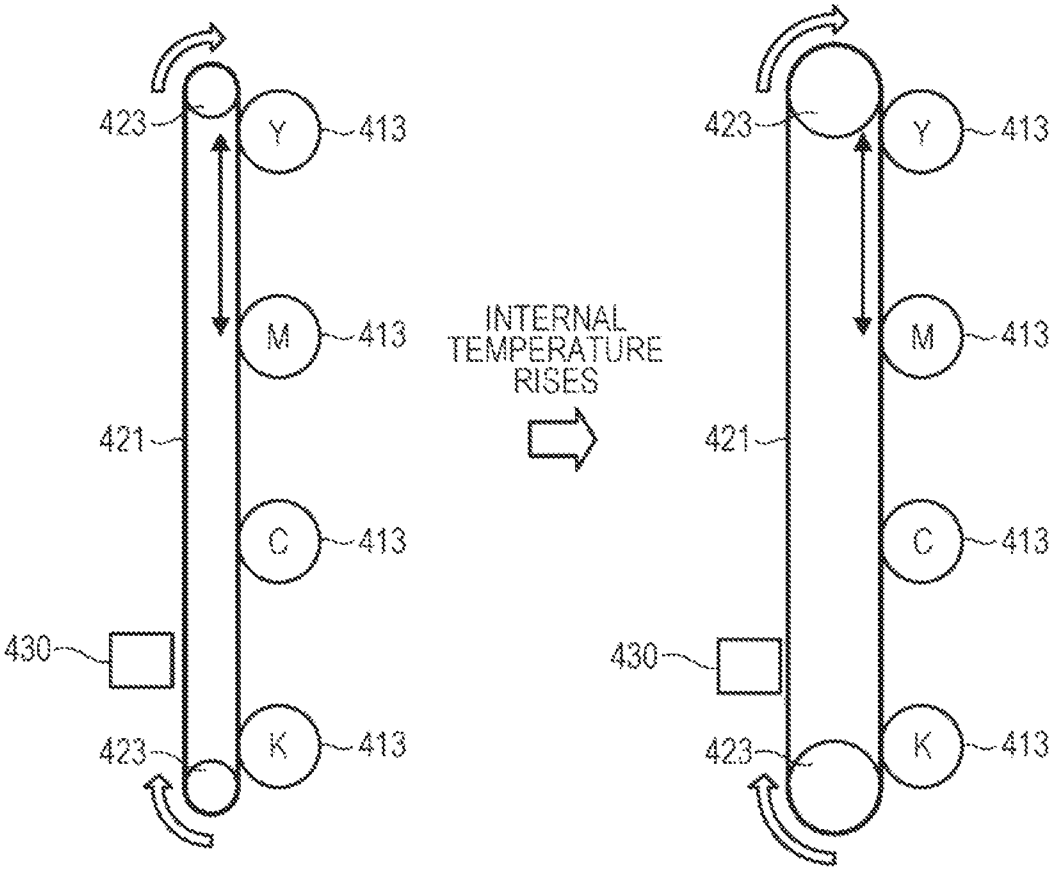
FIG. 1 is a diagram schematically illustrating color shift occurring at a time of color image formation.
Figure 2A:
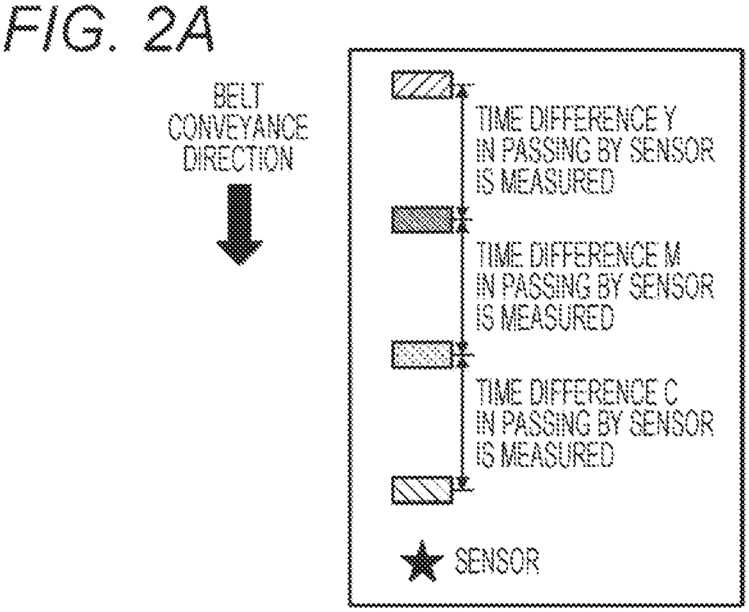
FIGS. 2A to 2C are diagrams schematically illustrating color resist correction according to a conventional technique.
Figure 2B:
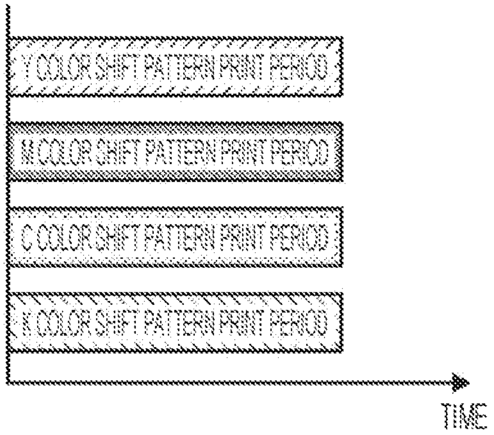
Figure 2C:
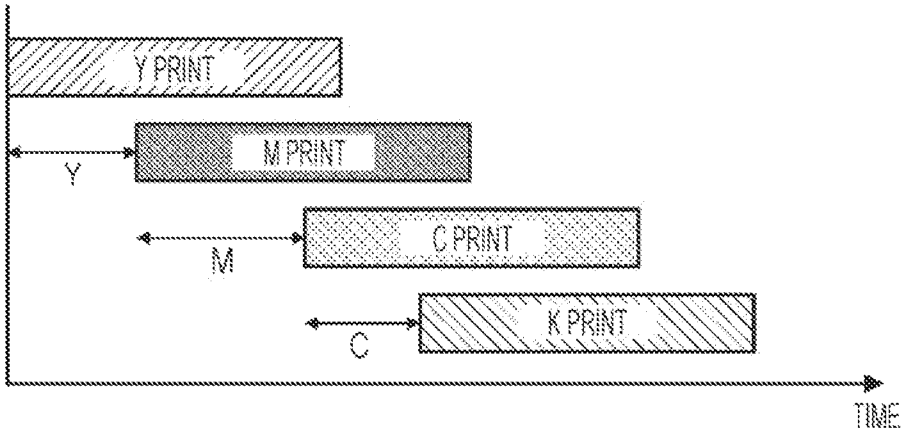
Figure 3:
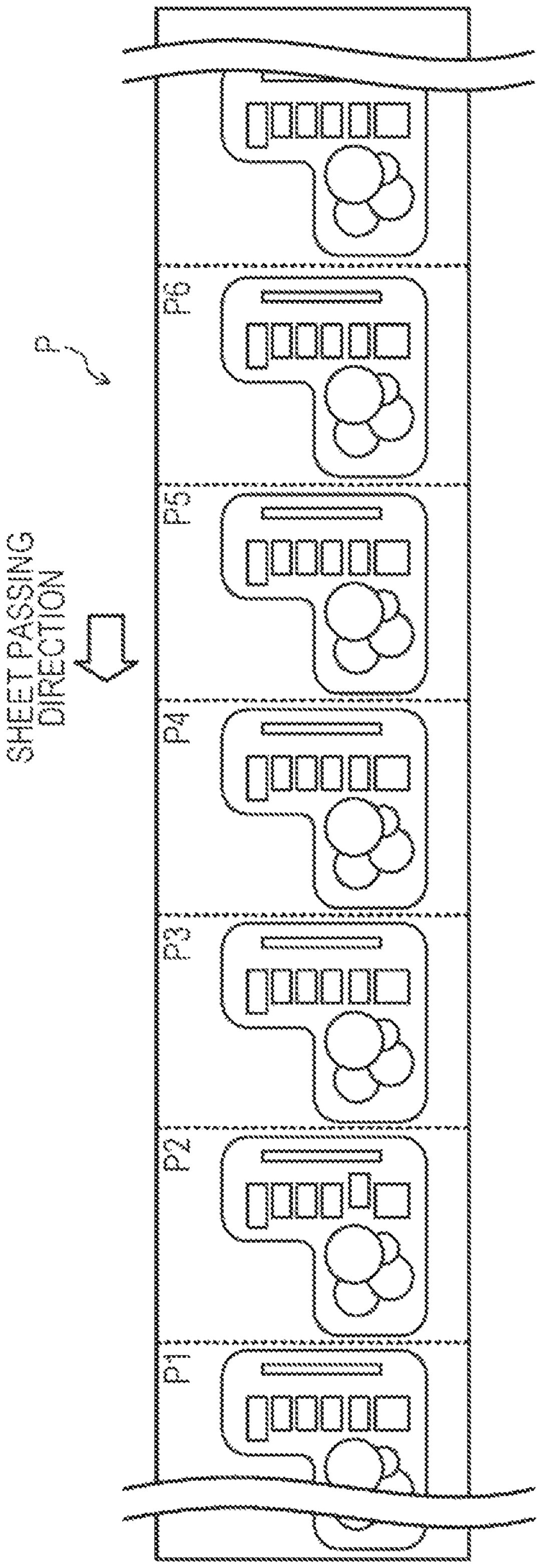
FIG. 3 is a diagram illustrating an example of a mode in which an image is formed on continuous paper.

Hereinafter, one or more embodiments of the present invention will be described with reference to the drawings. However, the scope of the invention is not limited to the disclosed embodiments. Note that, in the present description and the drawings, components having substantially the same function are denoted by the same reference numerals, and redundant description is omitted.

Hereinafter, an example of a configuration of an image forming apparatus (hereinafter, referred to as an "image forming apparatus U") according to one embodiment of the present invention will be described with reference to FIGS. 5 to 9.

Figure 5:
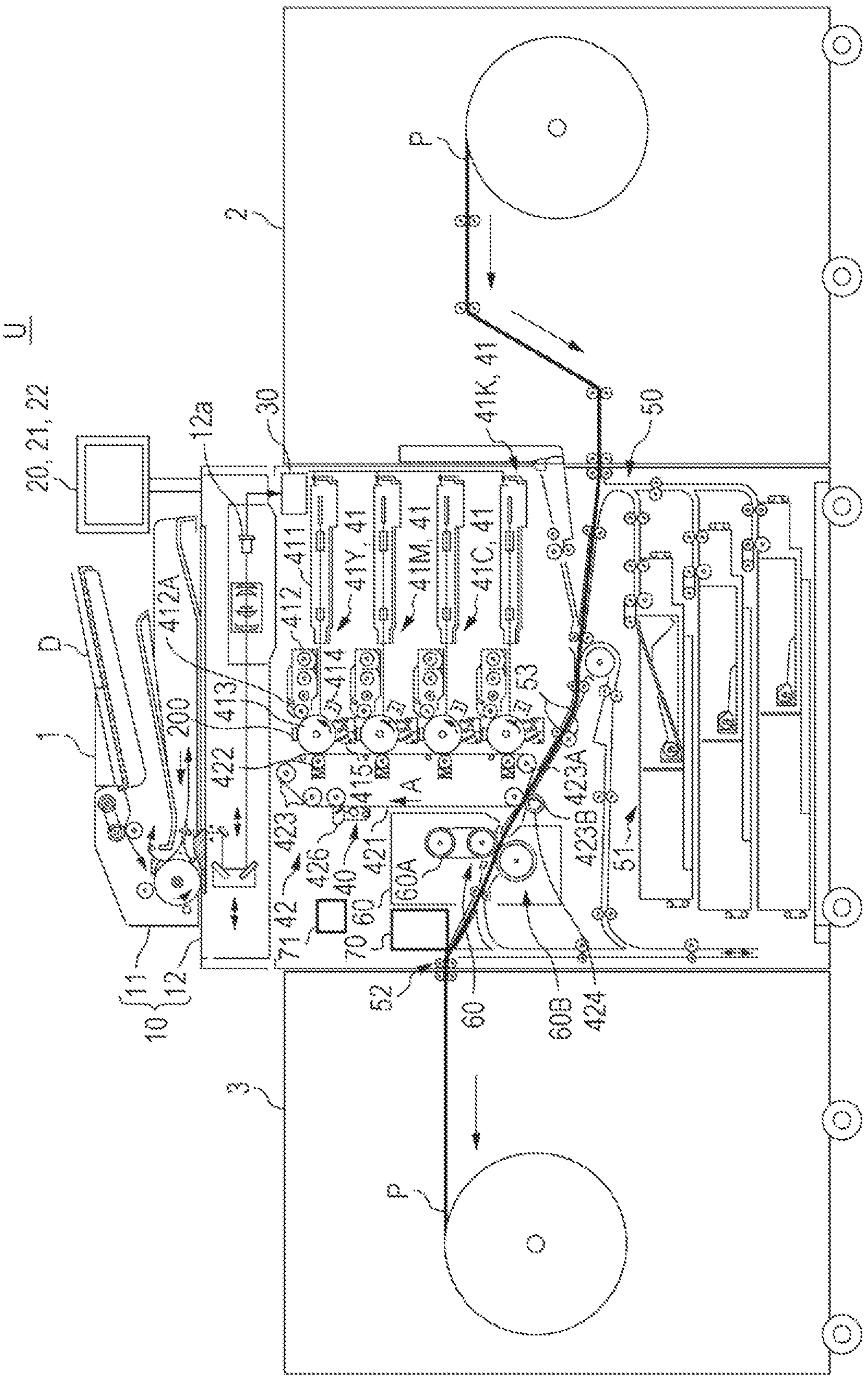
FIG. 5 is a view schematically illustrating an overall configuration of an image forming apparatus according to one embodiment of the present invention.
Figure 6:
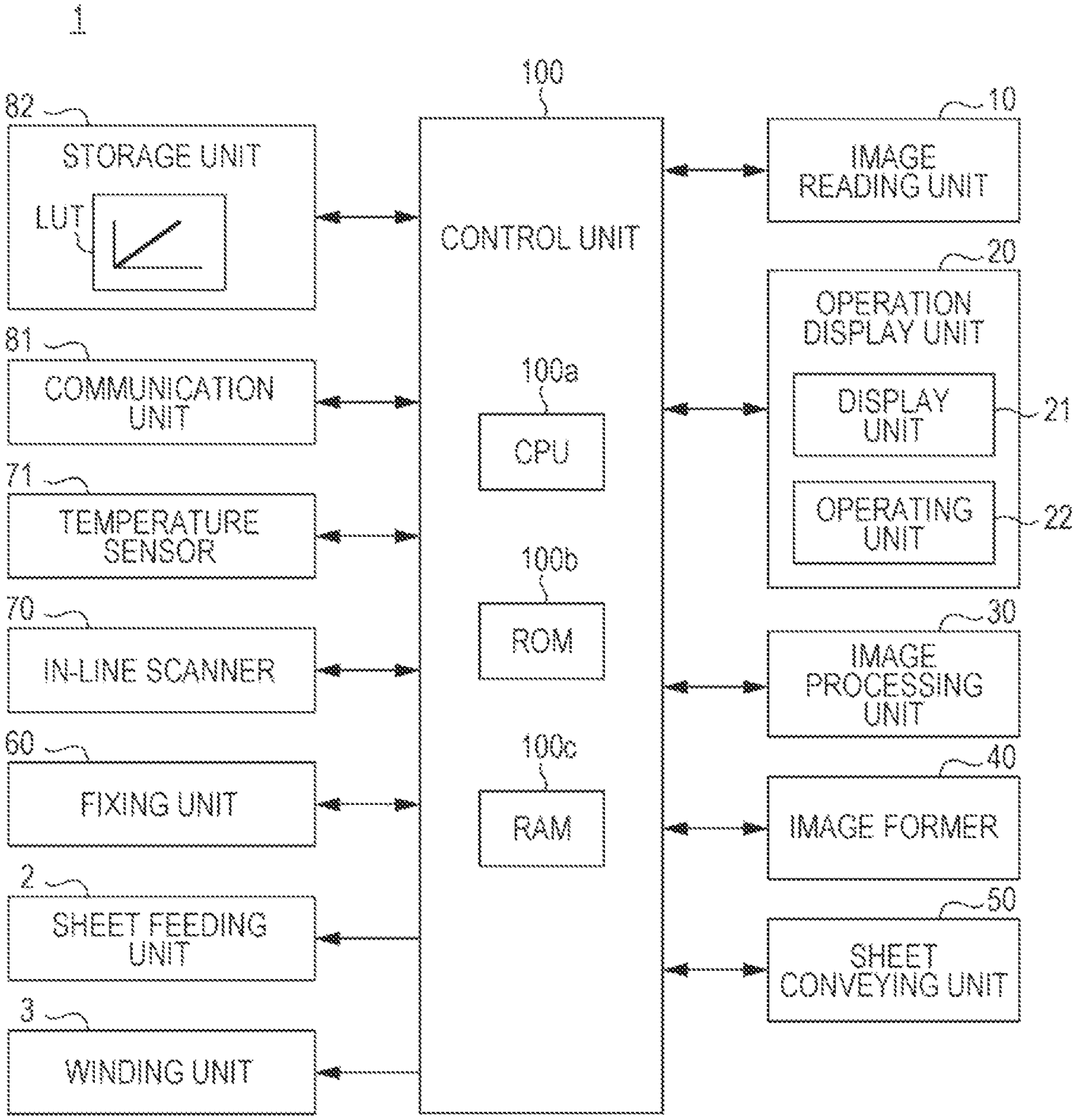
FIG. 6 is a diagram illustrating main parts of a control system of an image forming unit included in an image forming apparatus according to one embodiment of the present invention.

FIG. 5 is a view schematically illustrating an overall configuration of the image forming apparatus U according to the present embodiment. FIG. 6 is a diagram illustrating a main part of a control system of the image forming unit 1 included in the image forming apparatus U according to the present embodiment.

The image forming apparatus U is a system that forms an image on a continuous paper P using the continuous paper P as a recording medium. The continuous paper P is a recording medium having a length exceeding a main body width of the image forming unit 1 in a conveying direction, and includes, for example, rolled paper or the like.

As illustrated in FIG. 5, the image forming apparatus U is configured by connecting a sheet feeding unit 2, an image forming unit 1, and a winding unit 3 from an upstream side along the conveying direction of the continuous paper P. The sheet feeding unit 2 and the winding unit 3 are used when an image is formed on the continuous paper P.

The sheet feeding unit 2 is a device that feeds the continuous paper P to the image forming unit 1. In the housing of the sheet feeding unit 2, the continuous paper P is wound around a support shaft in a roll shape and rotatably held. The sheet feeding unit 2 conveys, for example, the continuous paper P wound around the support shaft to the image forming unit 1 at a constant speed via a plurality of conveyance roller pairs such as a feeding roller and a sheet feeding roller. The sheet feeding operation of the sheet feeding unit 2 is controlled by the control unit 100 included in the image forming unit 1.

The image forming unit 1 forms a color image using an electrophotographic process technology. That is, the image forming unit 1 primarily transfers toner images of respective colors of yellow (Y), magenta (M), cyan (C), and black (K) formed on the photoconductor drum 413 to the intermediate transfer belt 421, superimposes the toner images of four colors on the intermediate transfer belt 421, and then secondarily transfers the toner images to the continuous paper P fed from the sheet feeding unit 2, thereby forming a color image on the continuous paper P.

In addition, the image forming unit 1 employs a tandem system in which photoconductor drums 413 corresponding to four colors of Y, M, C, and K are arranged in series in a traveling direction of the intermediate transfer belt 421, and the toner images of respective toner colors are sequentially transferred to the intermediate transfer belt 421 in a single procedure.

As illustrated in FIG. 6, the image forming unit 1 includes an image reader 10, an operation display unit 20, an image processor 30, an image former 40, a sheet conveying unit 50, a fixing unit 60, an in-line scanner 70, a temperature sensor 71, a communication unit 81, a storage unit 82, and a control unit 100.

The control unit 100 includes a central processing unit (CPU) 100*a*, a read only memory (ROM) 100*b*, a random access memory (RAM) 100*c*, and the like. The CPU 100*a* reads out a program corresponding to processing content from the ROM 100*b*, expands the program in the RAM 100*c*, and centrally controls operation of each block and the like of the image forming unit 1 in cooperation with the expanded program. At this time, various data stored in the storage unit 82 are referred to. The storage unit 82 includes, for example, a nonvolatile semiconductor memory (what is called a flash memory) or a hard disk drive.

The control unit 100 transmits and receives various data to and from an external device (for example, a personal computer (not illustrated)) connected to a communication network such as a local area network (LAN) or a wide area network (WAN) via the communication unit 81. For example, the control unit 100 receives image data (input image data) transmitted from an external device, and forms an image on the continuous paper P based on the image data. The communication unit 81 includes, for example, a communication control card such as a LAN card.

As illustrated in FIG. 5, the image reader 10 includes an automatic document feeding device 11 called an auto document feeder (ADF), a document image scanning device 12 (scanner), and so on.

The automatic document feeding device 11 conveys a document D placed on a document tray by a conveying mechanism and feeds the document D to the document image scanning device 12. By the automatic document feeding device 11, it is possible to continuously read images (including both sides) of a large number of documents D placed on the document tray all at once.

The document image scanning device 12 optically scans a document conveyed onto a contact glass from the automatic document feeding device 11 or a document placed on the contact glass, forms an image of reflected light from the document on a light receiving surface of a charge coupled device (CCD) sensor 12*a*, and reads the document image. The image reader 10 generates input image data based on a reading result of the document image scanning device 12. The input image data is subjected to predetermined image processing in the image processor 30.

As illustrated in FIG. 5, the operation display unit 20 includes, for example, a liquid crystal display (LCD) with a touch panel, and functions as a display unit 21 and an operating unit 22. The display unit 21 displays various operation screens, image states, operation states of each function, information regarding printing, and the like according to a display control signal input from the control unit 100. The operating unit 22 includes various operation keys such as a numeric keypad and a start key, receives various input operations by a user, and outputs an operation signal to the control unit 100.

The image processor 30 includes a circuit or the like that performs digital image processing on input image data according to initial settings or user settings. For example, the image processor 30 performs gradation correction under control of the control unit 100 based on gradation correction data (gradation correction table). Further, the image processor 30 performs various correction processing such as color correction and shading correction, compression processing, and the like on the input image data, in addition to the gradation correction. The image former 40 is controlled based on the image data that has been subjected to these processes.

As illustrated in FIG. 5, the image former 40 includes toner image formers 41Y, 41M, 41C, and 41K for forming images with color toners of a Y component, an M component, a C component, and a K component based on input image data, an intermediate transfer unit 42, and the like.

The toner image formers 41Y, 41M, 41C, and 41K for the Y component, the M component, the C component, and the K component have the same configuration. For convenience of illustration and description, common components are denoted by the same reference numerals, and when distinguishing from each other, reference numerals are appended with Y, M, C, or K. In FIG. 5, only components of the toner image former 41Y for the Y component are denoted by reference numerals, and reference numerals of other components of the toner image formers 41M, 41C, and 41K are omitted.

The toner image former 41 includes an exposure device 411, a developing device 412, the photoconductor drum 413, a charging device 414, a drum cleaning device 415, a toner collection unit 200, and the like.

The photoconductor drum 413 is formed by, for example, an organic photoconductor in which a photoconductive layer formed by resin containing an organic photoconductor is formed on an outer peripheral surface of a drum-shaped metal base. Note that the control unit 100 rotates the photoconductor drum 413 at a constant peripheral speed by controlling a drive current supplied to a drive motor (not illustrated) that rotates the photoconductor drum 413.

The charging device 414 is, for example, an electrostatic charger and generates a corona discharge to thereby uniformly charge a surface of the photoconductor drum 413 having photoconductivity to a negative polarity.

The exposure device 411 includes, for example, a semiconductor laser, and irradiates the photoconductor drum 413 with a laser beam corresponding to an image of each toner color component. As a result, an electrostatic latent image of each toner color component is formed in the image area irradiated with the laser beam on the surface of the photoconductor drum 413 due to a potential difference from the background area.

The developing device 412 is a two-component reversal type developing device, and visualizes the electrostatic latent image by attaching the developer of each toner color component to the surface of the photoconductor drum 413 to develop the electrostatic latent image as a toner image.

A developing roller 412A included in the developing device 412 carries the developer while rotating, and supplies the toner contained in the developer to the photoconductor drum 413. Specifically, a developing bias is applied from a developing bias application portion 412B to the developing roller 412A, and a potential difference is generated between the developing roller and the surface of the photoconductor drum 413, thereby forming a toner image on the surface of the photoconductor drum 413.

The drum cleaning device 415 is in contact with the surface of the photoconductor drum 413, has a tabular drum cleaning blade or the like having elasticity, and removes a toner remaining on the surface of the photoconductor drum 413 without being transferred to the intermediate transfer belt 421.

The intermediate transfer unit 42 includes the intermediate transfer belt 421, primary transfer rollers 422, a plurality of support rollers 423, a secondary transfer roller 424, a belt cleaning device 426, and so on.

The intermediate transfer belt 421 is formed by an endless belt, and is stretched in a loop around the plurality of support rollers 423. At least one of the plurality of support rollers 423 is formed by a driving roller, and the others are formed by driven rollers. For example, it is preferable that a roller 423A arranged downstream of the primary transfer roller 422 for the K component in a belt running direction is a driving roller. This makes it easier to keep a running speed of the belt in a primary transfer unit constant. Rotation of the driving roller 423A causes the intermediate transfer belt 421 to run in the direction of arrow A at a constant speed.

The intermediate transfer belt 421 is a belt having conductivity and elasticity, and has a high resistance layer on the surface. The intermediate transfer belt 421 is rotationally driven by a control signal from the control unit 100.

The primary transfer roller 422 is arranged on the inner peripheral surface side of the intermediate transfer belt 421 so as to face the photoconductor drum 413 of each toner color component. When the primary transfer roller 422 is pressed against the photoconductor drum 413 with the intermediate transfer belt 421 interposed therebetween, a primary transfer nip for transferring a toner image from the photoconductor drum 413 to the intermediate transfer belt 421 is formed.

The secondary transfer roller 424 is arranged on the outer peripheral surface side of the intermediate transfer belt 421, opposing a backup roller 423B arranged downstream of the driving roller 423A in the belt running direction. The secondary transfer roller 424 is pressed against the backup roller 423B with the intermediate transfer belt 421 interposed therebetween, thereby forming a secondary transfer nip for transferring the toner image from the intermediate transfer belt 421 to the continuous paper P.

When the intermediate transfer belt 421 passes through the primary transfer nip, the toner images on the photoconductor drum 413 are sequentially overlapped and primary-transferred on the intermediate transfer belt 421. Specifically, a primary transfer bias is applied to the primary transfer roller 422 and a charge having a polarity opposite to that of the toner is given to a back side of the intermediate transfer belt 421, that is, a side in contact with the primary transfer roller 422, thereby electrostatically transferring the toner image to the intermediate transfer belt 421.

Thereafter, when the continuous paper P passes through the secondary transfer nip, the toner image on the intermediate transfer belt 421 is secondarily transferred to the continuous paper P. Specifically, a secondary transfer bias is applied to the secondary transfer roller 424 and a charge having a polarity opposite to that of the toner is given to a back surface side of the continuous paper P, that is, a side in contact with the secondary transfer roller 424, thereby electrostatically transferring the toner image to the continuous paper P. The continuous paper P to which the toner image has been transferred is conveyed toward the fixing unit 60.

The belt cleaning device 426 removes a transfer residual toner remaining on the surface of the intermediate transfer belt 421 after the secondary transfer. Note that, instead of the secondary transfer roller 424, what is called a belt type secondary transfer unit having a configuration in which a secondary transfer belt is stretched in a loop on a plurality of support rollers including the secondary transfer roller may be employed.

The fixing unit 60 includes an upper fixing unit 60A having a fixing surface side member disposed on the fixing surface of the continuous paper P, that is, the surface on which the toner image is formed, a lower fixing unit 60B having a back surface side supporting member on the back surface of the continuous paper P, that is, the surface opposite to the fixing surface, a heating source, and the like. When the back surface side supporting member is brought into pressure contact with the fixing surface side member, a fixing nip for nipping and conveying the continuous paper P is formed. The fixing unit 60 heats and pressurizes the continuous paper P, to which the toner image has been secondarily transferred and which has been conveyed thereto, with the fixing nip, thereby fixing the toner image on the continuous paper P.

The in-line scanner 70 captures and reads an image related to a color shift measurement patch formed on the continuous paper P by, for example, a built-in charge coupled device (CCD) sensor, a complementary metal oxide semiconductor (CMOS) sensor, or the like. The in-line scanner 70 is disposed, for example, at a position facing the continuous paper P on the downstream side of the fixing unit 60 of a conveying path unit 53, and captures an image of the color shift measurement patch. The in-line scanner 70 can perform imaging in each of RGB wavelength bands (a plurality of wavelength bands).

The color shift measurement patch is, for example, a predetermined pattern formed separately for each toner color. The color shift measurement patch is formed, for example, in a predetermined blank region out of an area where a document image is formed in the continuous paper P so that a color shift amount of an image forming region of each color generated during execution of printing according to print job data is detected (for example, as described later with reference to FIG. 10).

As a unit for detecting the image of the color shift measurement patch, a photosensor may be used instead of the in-line scanner 70.

The temperature sensor 71 is, for example, a thermistor or a radiation temperature sensor, is disposed in the image forming apparatus U, and detects the internal temperature of the image forming apparatus U. For example, the temperature sensor 71 is provided adjacent to the driving rollers 423 that stretch the intermediate transfer belt 421 so as to be capable of detecting that the driving roller diameter of the intermediate transfer belt 421 has changed and the color shift amount has changed with a change in the internal temperature of the image forming apparatus U.

The sheet conveying unit 50 includes a paper feed unit 51, a paper discharge unit 52, a conveying path unit 53, and so on. The conveying path unit 53 includes a plurality of conveyance roller pairs, and conveys the continuous paper P fed from the sheet feeding unit 2 to the image former 40 and the fixing unit 60, and then sends the continuous paper P to the winding unit 3. Note that the plurality of conveyance roller pairs of the conveying path unit 53 includes a resist roller pair that corrects an inclination and a shift of the continuous paper P.

Note that the paper feed unit 51 is a plain sheet feeder provided separately from the sheet feeding unit 2, and feeds a sheet having a length not exceeding the main body width of the image forming unit 1. In the three sheet feed tray units constituting the paper feed unit 51, sheets identified based on basis weight, size, and the like are stored for each preset type.

The continuous paper P fed from the sheet feeding unit 2 to the image forming unit 1 is conveyed to the image former 40 by the conveying path unit 53. Then, in the image former 40, the toner image on the intermediate transfer belt 421 is secondarily transferred collectively to one surface of the continuous paper P, and a fixing step is performed in the fixing unit 60. The continuous paper P on which an image has been formed is conveyed to the winding unit 3 by the paper discharge unit 52 including a conveyance roller pair (paper ejection roller pair).

The winding unit 3 is a device that winds the continuous paper P conveyed from the image forming unit 1. In the housing of the winding unit 3, for example, the continuous paper P is wound around a support shaft and held in a roll shape. Therefore, the winding unit 3 winds the continuous paper P conveyed from the image forming unit 1 around the support shaft at a constant speed via a plurality of conveyance roller pairs (for example, a feed roller and a sheet discharge roller).

[Detailed Configuration of Control Unit 100]

Next, a functional configuration of the control unit 100 according to the present embodiment will be described. The control unit 100 according to the present embodiment is configured to be capable of performing color resist correction during execution of a print job (that is, during execution of printing on the continuous paper P).

Figure 7:
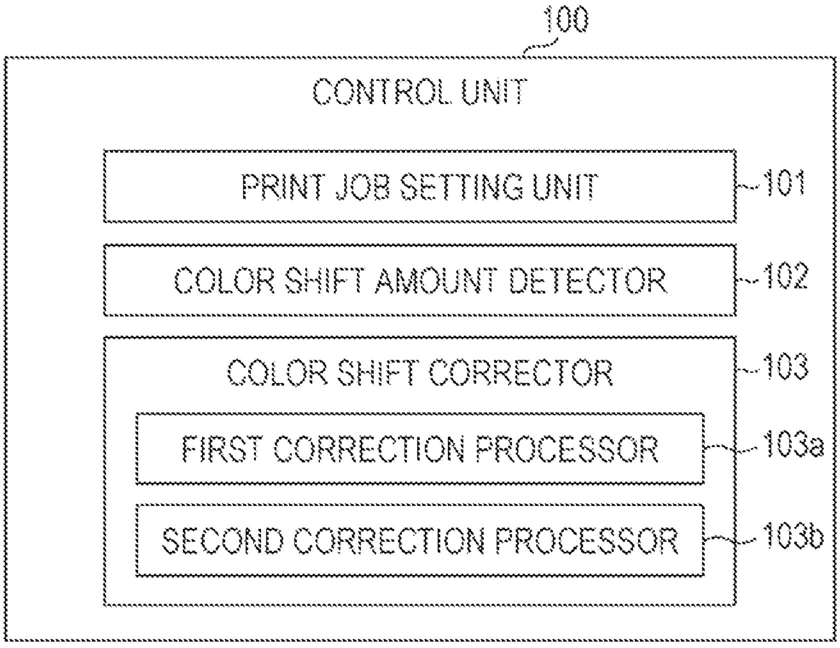
FIG. 7 is a diagram illustrating a functional configuration of a control unit according to one embodiment of the present invention.

FIG. 7 is a diagram illustrating a functional configuration of the control unit 100 according to the present embodiment.

Figure 8:
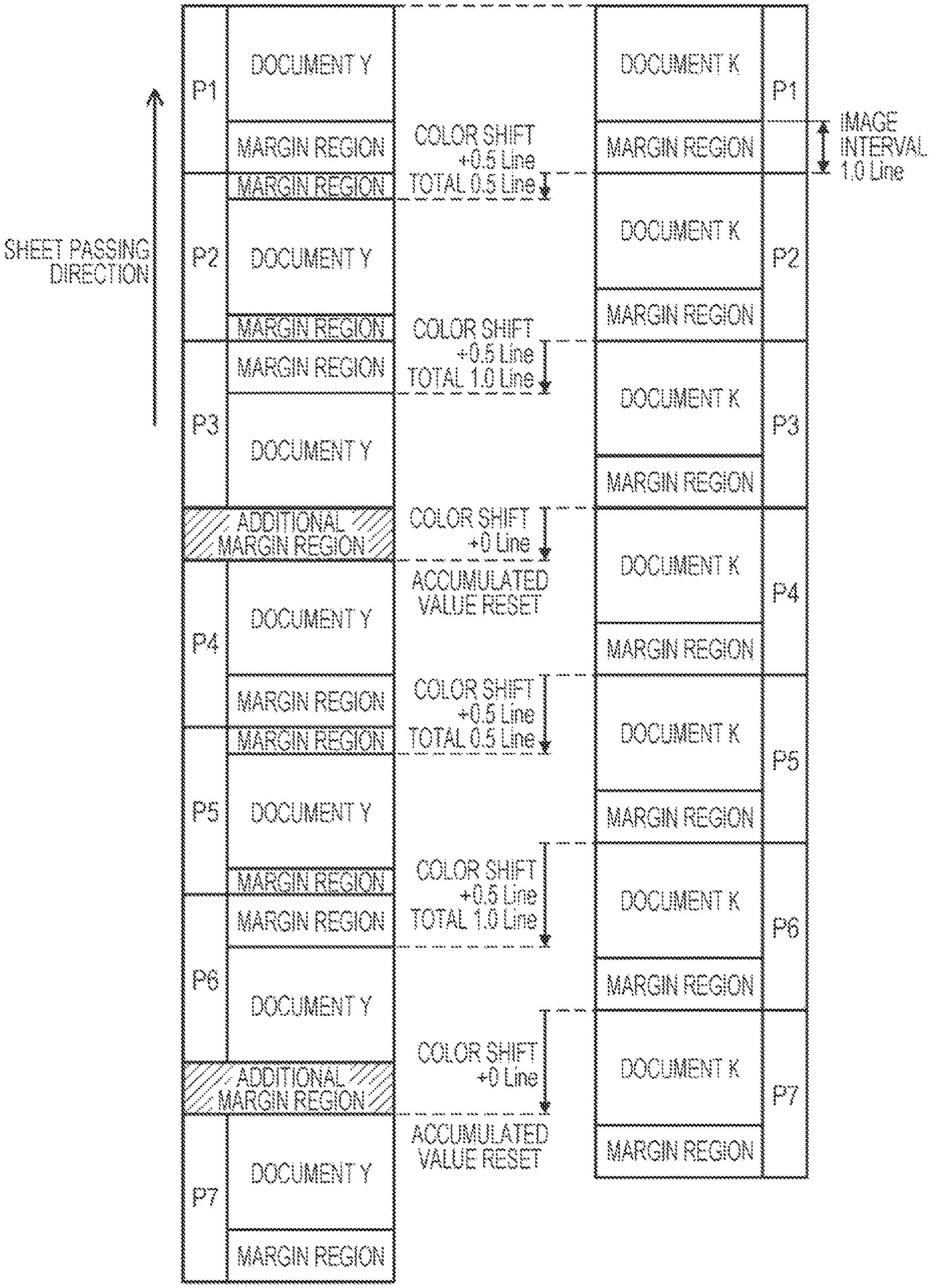
FIG. 8 is a diagram illustrating color resist correction according to one embodiment of the present invention.
Figure 9:
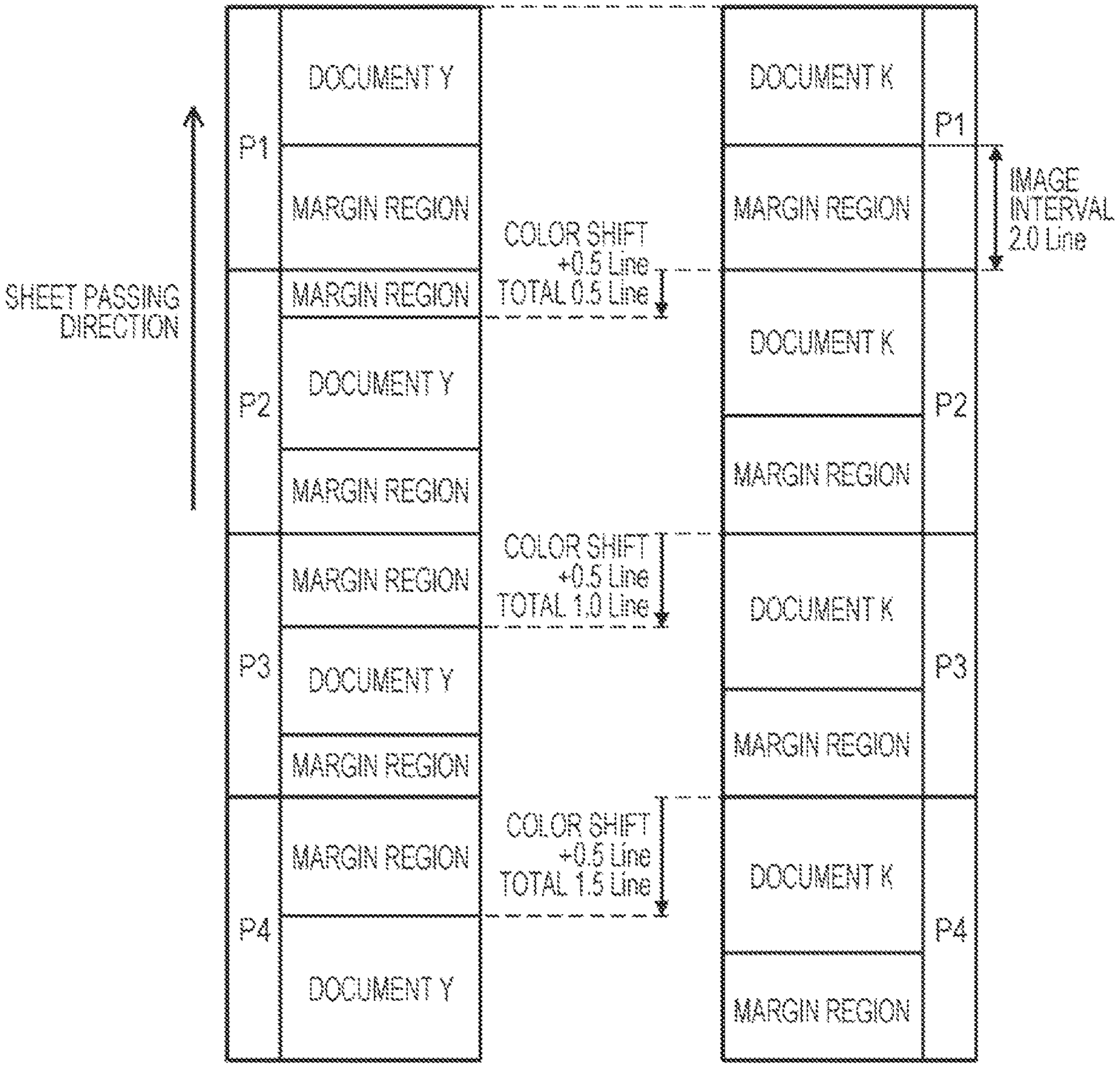
FIG. 9 is a diagram illustrating color resist correction according to a comparative example.

FIG. 8 is a diagram for explaining color resist correction according to the present embodiment. FIG. 9 is a diagram for explaining color resist correction according to a comparative example. Note that the color resist correction according to a comparative example is color resist correction using two-dimensional position correction according to the prior art.

FIGS. 8 and 9 schematically illustrate the print job data corrected by the color resist correction in a case where the color shift occurs with respect to Y color, and illustrate how the image forming region of each color (here, Y color) is corrected on data by the color resist correction. In FIGS. 8 and 9, "P1", . . . , and the like represent page numbers of the first page and the like, "document Y (or document K)" represents an image forming region within the page, and "margin region" represents a margin region within the page. Further, a width in a vertical direction of a "document Y (or document K)" and a width in the vertical direction of the "margin region" represent respective occupancy widths in the sheet passing direction within the page.

The control unit 100 has functions of a print job setting unit 101, a color shift amount detector 102, and a color shift corrector 103.

The print job setting unit 101 generates print job data based on image data as a print target.

Figure 4A:
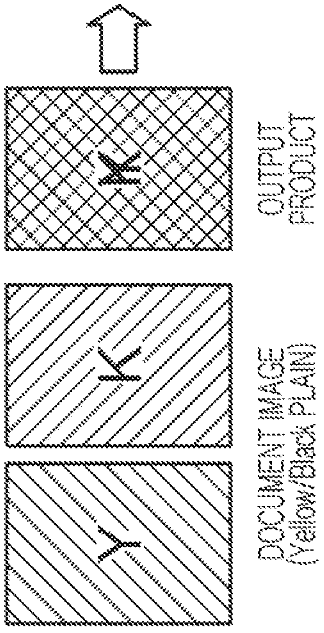
FIGS. 4A and 4B are diagrams schematically illustrating two-dimensional position correction.
Figure 4B:
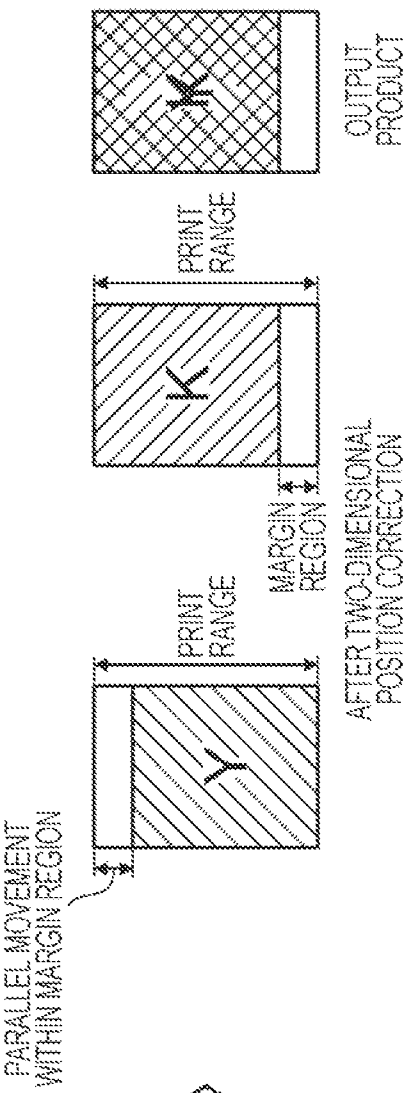

Here, the print job setting unit 101 generates print job data obtained by converting image data of each color of each page as a print target into a format including an image forming region (area of document Y (or document K) in FIGS. 8 and 9) and a margin region (in FIGS. 8 and 9, a margin region for 1 Line) having a prescribed width (hereinafter, also referred to as a "first width") provided on the upstream side and/or the downstream side in the sheet passing direction with respect to the image forming region so that color resist correction similar to the two-dimensional position correction described with reference to FIGS. 4A and 4B can be executed.

In the print job data generated by the print job setting unit 101, as illustrated in FIG. 8, a reference position (in FIG. 8, the upper end position of each page) of the image forming region of each page is set so that the image forming region (that is, the image forming region for 4 Lines) of each page is arranged in order along the sheet passing direction with a margin region (that is, a margin region for 1 Line) having the first width interposed between the image forming region and the image forming region of the immediately preceding page.

In FIGS. 8 and 9, the position of the image forming region and the margin region within the page is expressed by setting 600 dpi unit (42 um) as "1 Line". In the print job data of FIG. 8, in the state before correction, the image data of each page continues to the image forming region for 4 Lines from the upper end position, and a margin region for 1 Line is secured. On the other hand, in the print job data of FIG. 9, in the state before correction, the image data of each page continues to the image forming region for 4 Lines from the upper end position, and a margin region for 2 Lines is secured.

The color shift amount detector 102 detects the color shift amount of each color of the image forming region generated during execution of printing related to the print job data in units of pages. At this time, the color shift amount detector 102 detects the color shift amount without stopping the image forming operation on the continuous paper P using, for example, one or both of the following two detection methods.

Since the color shift amount is a relative positional relationship between colors, the color shift amount of each color is expressed as, for example, a positional shift amount with a specific color as a reference position. For example, the color shift amount detector 102 detects a color shift amount of an image formation position of another color with reference to an image formation position of K color.

As the first method, there is a method in which the internal temperature of the image forming apparatus U is sensed by the temperature sensor 71 installed in the image forming apparatus U, and the color shift amount of each color is detected by being estimated from the internal temperature. This method utilizes an empirical rule that a representative cause of color shift is due to a change in the length of the intermediate transfer belt 421 depending on a change in the internal temperature of the image forming apparatus U. In this method, for example, the correspondence relationship between the internal temperature of the image forming apparatus U and the color shift amount is stored in advance as a data table, and the color shift amount detector 102 detects the color shift amount of each color from the data table and the internal temperature of the image forming apparatus U indicated by the temperature sensor 71.

As a second method, an image of a color shift measurement patch is formed in a predetermined blank region set at a position shifted in a lateral width direction (which means a direction orthogonal to the sheet passing direction, the same applies hereinafter) with respect to the image forming region of each page in the continuous paper P, and the color shift amount of each color is detected by sensing the image of the color shift measurement patch by the in-line scanner 70. Thus, in the image forming apparatus U, the color shift amount of each color can be directly detected without stopping the process of forming the print target image on the continuous paper P. Note that, in this method, the color shift amount may be detected using a photosensor (not illustrated) instead of the in-line scanner 70.

Figure 10:
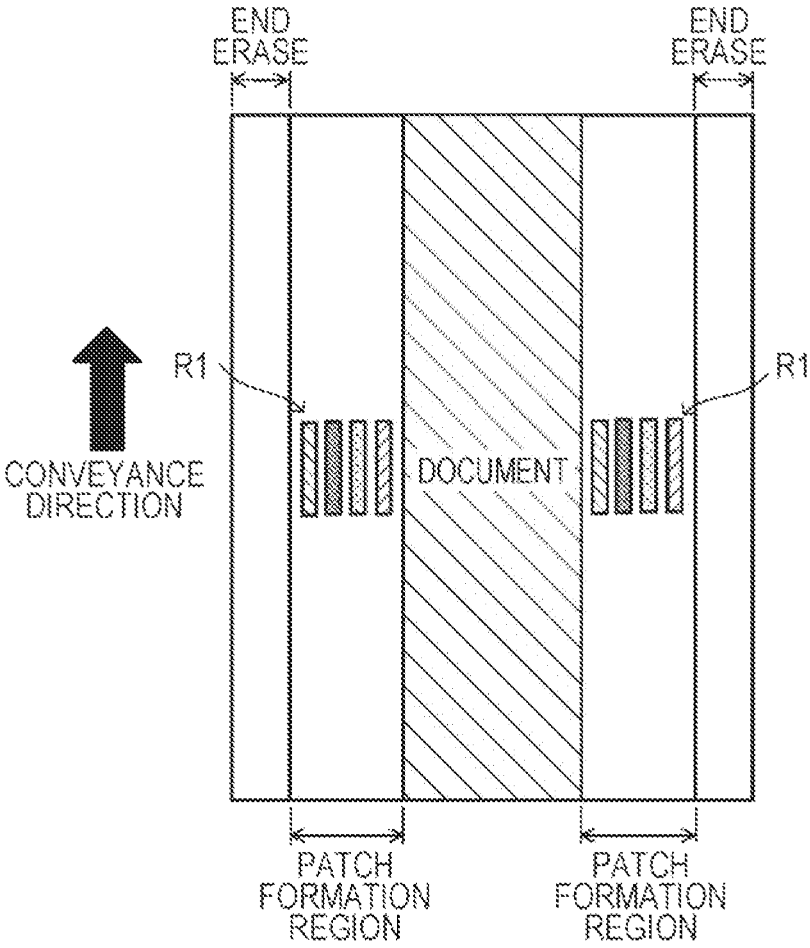
FIG. 10 is a diagram illustrating a mode of a formation region of a color shift measurement patch according to one embodiment of the present invention.

FIG. 10 illustrates a mode of the color shift measurement patch. FIG. 10 illustrates the color shift measurement patch (see R1 in FIG. 10) in which each of four colors of YMCK is formed in a bar shape. In the color shift measurement patch, the color shift amount is detected by the positional shift of the bar of each of the four colors of Y, M, C, and K.

Note that the color shift measurement patch is formed, for example, in a blank region provided in an end region in the lateral width direction of each page. In FIG. 10, the formation region of the color shift measurement patch is formed at both ends within the page, but such formation region may be selected by the user from either of both ends, a left end, or a right end.

When the second method is used, the frequency of forming the color shift measurement patch may be every several pages instead of every one page. In the image forming apparatus U, there is a case where a discarding band pattern is printed in the blank region of a sheet at a time of low coverage. This is to ensure constant toner consumption in consideration of the fact that image formation cannot be performed due to deterioration of the developer when a sheet is passed over a long distance with low coverage. At this time, the color shift measurement patch and the discarding band pattern cannot be overlapped. In this regard, the variation in color shift is long-term, and the color shift amount does not change in a short term. Therefore, for example, a color shift measurement patch may be formed on one page in five pages, and a discarding band pattern may be formed on the remaining four pages. Note that, in this case, the color shift amount of a page in which the color shift amount is not actually detected is only required to be analogized from the color shift amount obtained in the page in which the color shift amount is detected.

When detecting the color shift amount of each color, the color shift amount detector 102 may change the detection method for each color. For example, in a case where a color image is formed by superimposing five colors of Y color, M color, C color, K color, and W color (white color), it is preferable that the color shift amount is detected for four colors of Y color, M color, C color, and K color by the above-described second method (detection method using the in-line scanner 70), and the color shift amount is detected for W color by the above-described first method (detection method using the temperature sensor 71). This is because the W color generally has a small contrast difference from the continuous paper P, and thus it is difficult for the in-line scanner 70 and the photosensor to accurately detect the W color, and it is preferable to apply the first method not only to the W color but also to any color having no contrast with the continuous paper P.

When performing printing related to the print job data set in the print job setting unit 101, the color shift corrector 103 corrects a formation position of an image forming region of a print target page next set in the print job data (hereinafter abbreviated as a "print target page") based on the color shift amount in a verification target page one or more pages before the print job data (for example, the immediately preceding page). In the present embodiment, a page one page before the print target page is the verification target page.

More specifically, the color shift corrector 103 includes a first correction processor 103*a* that compensates for at least a part of the color shift amount by moving the formation position of the image forming region within the print target page in parallel in the sheet passing direction from the reference position within the range of the margin region set for each page for the color to be corrected on the print job data set in the print job setting unit 101, and a second correction processor 103*b* that compensates for at least a part of the color shift amount by inserting an additional blank region of a second width (for example, second width=first width) (in the present embodiment, 600 dpi (42 um)) that does not constitute a page on the upstream side in the sheet passing direction of the print target page for the color to be corrected on the print job data set in the print job setting unit 101. Then, the color shift corrector 103 compensates for the entire color shift amount of the print target page by the correction processing of the first correction processor 103*a* and the correction processing of the second correction processor 103*b*, and superimposes images of respective colors on the intermediate transfer body.

Here, the correction processing of the first correction processor 103*a* is a process of correcting the formation position of the image forming region within the print target page on the print job data, and is a process similar to the two-dimensional position correction according to the prior art. Note that a correctable range of the formation position of the image forming region by the first correction processor 103*a* is a range of a prescribed width (that is, the first width) of the margin region of each page.

The correction processing of the second correction processor 103*b* is correction processing of shifting the start position of the page between colors on the print job data. The correction processing of the second correction processor 103*b* is implemented, for example, by inserting additional data of the additional blank region between the image data of the print target page on the print job data and the image data of the immediately preceding page. However, the correction processing of the second correction processor 103*b* may be implemented by changing a non-exposure time in the exposure device 411 between pages.

Note that, for design reasons of print job data, relatively fine position correction can be performed in the correction processing of the first correction processor 103*a*, but in the correction processing of the second correction processor 103*b*, only relatively coarse position correction can be performed. Specifically, the correction resolution (that is, shift correction of the image forming region within the page) of the correction processing of the first correction processor 103*a* according to the present embodiment is in units of 19200 dpi (1.3 um) (that is, 0.03 Lines), whereas the correction resolution (that is, the additional blank region is inserted between pages) of the correction processing of the second correction processor 103*b* is in units of 600 dpi (42 um) (that is, 1 Line).

Here, a difference between the color resist correction according to the present embodiment and color resist correction according to the comparative example will be described. Note that the color resist correction according to the present embodiment is particularly useful in that it can cope with accumulation of color shift in the sheet passing direction that occurs when printing is continued without a gap on the continuous paper P.

As described above, since the color shift usually occurs due to expansion of the belt length of the intermediate transfer belt 421 or the like, once the color shift occurs, the color shift amount is accumulated by the same degree of width in accordance with the progress of the print target page for a certain period until the internal temperature of the image forming apparatus U returns to the original temperature. For example, FIGS. 8 and 9 illustrate a state in which the color shift amount of a Y-color document with respect to a K-color document is accumulated by 0.5 Lines in accordance with the progress of the print target page.

At this time, in the color resist correction (that is, the two-dimensional position correction according to the conventional technique described with reference to FIGS. 4A and 4B) according to the comparative example, it is necessary to perform a process of gradually shifting the formation position of the image forming region of the document (in FIG. 9, a Y-color document) in which the color shift has occurred within each page to the downstream side in the sheet passing direction in accordance with the progress of the print target page.

Specifically, in the color resist correction according to the comparative example, in order to cope with the color shift amount, as illustrated in FIG. 9, the formation position of the image forming region of the Y-color document within each page is gradually shifted to the downstream side in the sheet passing direction in accordance with the progress of the print target page such that the image forming region of the Y document is shifted to the downstream side in the sheet passing direction by 0.5 Lines within the page on the second page, the image forming region of the Y document is shifted to the downstream side in the sheet passing direction by 1.0 Lines within the page on the third page, and the image forming region of the Y document is shifted to the downstream side in the sheet passing direction by 1.5 Lines within the page on the fourth page.

In such a color resist correction method according to the comparative example, when a color image of several tens or several hundreds of pages is formed on one continuous paper P, it can be seen found that it is necessary to secure a considerably large margin region of each page. In other words, in such a color resist correction method according to the comparative example, the margin region (blank region) of each page becomes unnecessarily long, and the method lacks practicality.

In this regard, the color shift corrector 103 according to the present embodiment compensates for the color shift amount of each color by the correction processing of the first correction processor 103*a* and the correction processing of the second correction processor 103*b*, thereby reducing the margin region set to each page.

Figure 11:
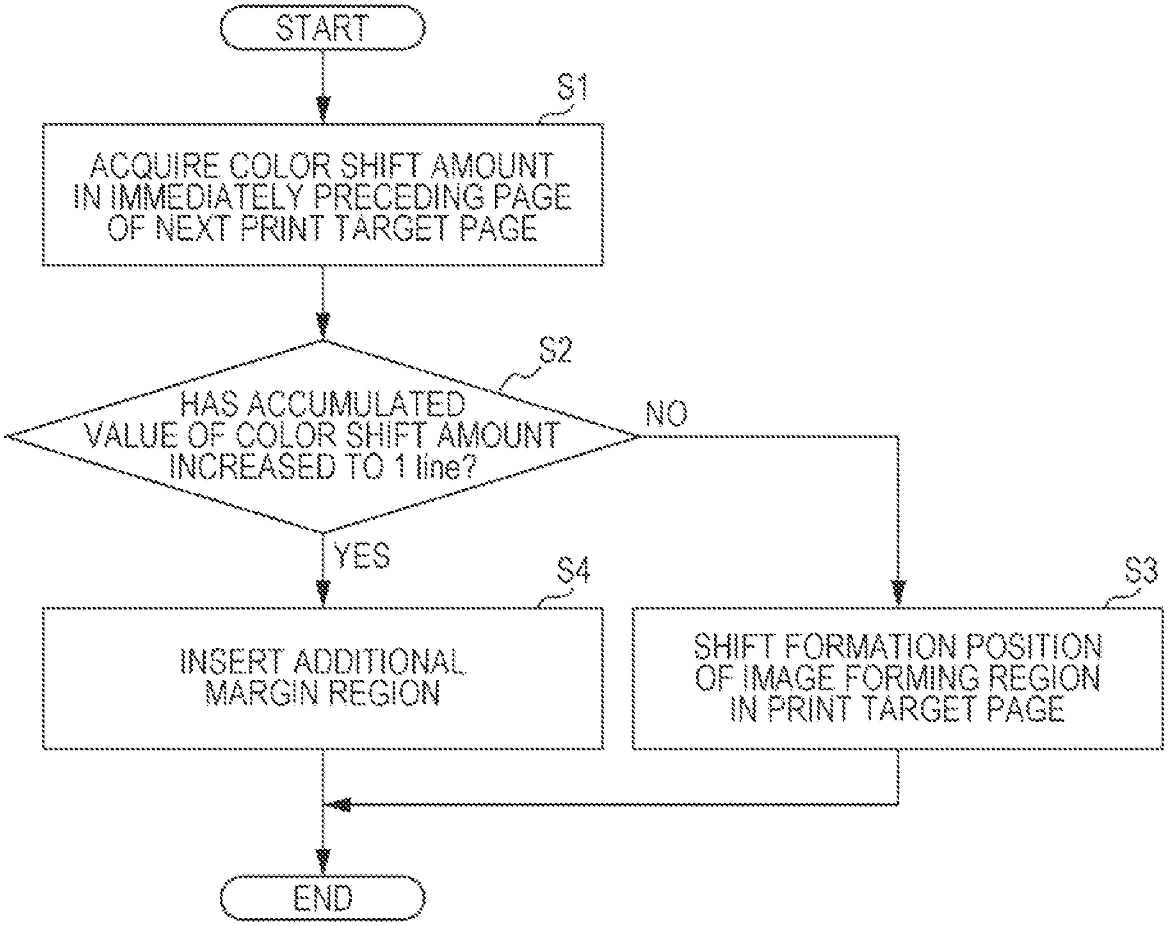
FIG. 11 is a flowchart describing an example of processing executed by a color shift corrector according to one embodiment of the present invention.

FIG. 11 is a flowchart describing an example of processing executed by the color shift corrector 103 according to the present embodiment. Here, the flowchart illustrated in FIG. 11 is processing executed by the color shift corrector 103 before the image of each page of the print job data is printed.

In step S1, the color shift corrector 103 acquires the color shift amount in the verification target page (here, the immediately preceding page) detected by the color shift amount detector 102. Here, the verification target page is a page immediately preceding the next print target page set in the print job data.

In step S2, by referring to past correction history data, for example, the color shift corrector 103 calculates an accumulated value of the color shift amount from previous insertion of the additional blank region (representing the additional blank region by the correction processing of the second correction processor 103*b*, and the same applies hereinafter) until the current correction timing. Then, the color shift corrector 103 determines whether or not the accumulated value has increased to be equal to or more than a prescribed width (here, 1 Line) of the margin region set for each page. Then, the color shift corrector 103 advances the processing to step S4 when the accumulated value of the color shift amount has increased to be equal to or more than the prescribed width (here, 1 Line) of the margin region (step S2: YES), and advances the processing to step S3 when the accumulated value of the color shift amount has not increased to be equal to or more than the prescribed width (here, 1 Line) of the margin region (step S2: NO).

In step S3, the color shift corrector 103 corrects the print job data so as to compensate only for the color shift amount in the current verification target page (here, the immediately preceding page) by moving the image forming region in parallel in the sheet passing direction from the reference position within the range of the margin region set to the next page (that is, the correction processing of the first correction processor 103*a*).

In step S4, the color shift corrector 103 corrects the print job data so as to compensate for the accumulated value of the color shift amount including the color shift amount in the current verification target page by inserting the additional blank region that does not constitute the page between the next print target page and the immediately preceding page (that is, the correction processing of the second correction processor 103*b*).

As described above, under a situation where it is necessary to gradually shift the formation position of the image forming region of the color to be corrected on the print job data in accordance with the progress of the print target page, the color shift corrector 103 takes a measure of shifting the start position of the page between colors on the print job data by the correction processing by the second correction processor 103*b*.

After such correction of the print job data is performed, the color shift corrector 103 permits execution of printing of the image of the print target page in the image former 40. By performing the processing of steps S1 to S4 for each print target page, the color shift correction of each page is performed in real time.

For example, in FIG. 8, when the color shift amount in which the phase of the Y-color document is advanced by 0.5 Lines with respect to the K-color document is detected on the second page, the color shift corrector 103 compensates for the color shift by delaying the phase of the formation position of the image forming region of the Y-color document within the page by 0.5 Lines on the print job data on the third page. At this time, since the accumulated value of the color shift amounts from the first page to the second page has not reached 1 Line, the color shift corrector 103 compensates for the color shift of the Y-color document by the correction processing of the first correction processor 103*a*.

Note that the threshold value (here, 1 Line) related to the accumulated value of the color shift amount is a range in which the image forming region can be moved by the two-dimensional position correction, and corresponds to a prescribed width of the margin region set for each page.

Next, in the third page, when the color shift amount in which the phase of the Y-color document is advanced by 0.5 Lines with respect to the K-color document is detected again, the color shift corrector 103 provides the additional blank region for 1.0 Lines between the third page and the fourth page for Y color, thereby causing the image former 40 to execute printing of the fourth page after compensating for the color shift amount of the third page (that is, the correction processing of the second correction processor 103*b*). At this time, since the accumulated value of the color shift amounts from the first page to the third page reaches 1 Line, the color shift corrector 103 compensates for the color shift of Y color by the correction processing of the second correction processor 103*b*.

Consequently, the page start position of Y color and the page start position of K color can be shifted by 1.0 Lines from the fourth page on the print job data, and the image forming region of Y color can be reset to the reference position (upper end position) within the page on the fourth page.

Thus, when the color shift amount in which the phase of the Y-color document is advanced by 0.5 Lines with respect to the K-color document is detected again on the fourth page, the color shift corrector 103 can compensate for the color shift by delaying the phase of the formation position of the image forming region of the Y-color document within the page by 0.5 Lines from the upper end position of the fifth page on the print job data on the fifth page (correction processing of the first correction processor 103*a*).

As described above, in the color shift corrector 103 according to the present embodiment, it can be seen that the correction processing in accordance with the progress of the print target page can be implemented only in the margin region for 1.0 Lines. This point is in contrast to the correction processing according to the comparative example in which it is necessary to secure an excessive margin region in order to implemented the correction processing in accordance with the progress of the print target page.

As described above, the color shift corrector 103 compensates for the color shift amount of each color by the correction processing of the first correction processor 103*a* and the correction processing of the second correction processor 103*b*, and superimposes the image of each color on the intermediate transfer belt 421.

In the above embodiment, the color shift corrector 103 performs the correction processing of the first correction processor 103*a* and/or the second correction processor 103*b* on the print job data in such a manner that the width of the margin region between the image forming region of the next print target page and the image forming region of the immediately preceding page is always constant (that is, in the present embodiment, the first width set to 1 Line) when the images of the respective colors are superimposed on the intermediate transfer belt 421. In the above embodiment, from a similar viewpoint, the "second width" of the additional blank region to be inserted between pages in the correction processing of the second correction processor 103*b* is set to the same width (in the present embodiment, 1 Line) as the prescribed width of the margin region of each page.

This is because the color shift corrector 103 makes the distance between the image forming regions of each page after printing constant. Accordingly, when the image of each page is cut out from the continuous paper P, it is possible to omit complicated processing such as detecting an image formation position for each page.

Effects

As described above, the image forming apparatus U according to the present embodiment includes:

- a print job setting unit 101 that performs job management for each color and generates print job data in which a margin region having a first width is set on an upstream side or a downstream side in a sheet passing direction of an image forming region of each page;
- a color shift amount detector 102 that detects, in units of pages, a color shift amount of each color of the image forming region generated while printing related to the print job data is performed; and
- a color shift corrector 103 that corrects a formation position of the image forming region to be a print target page next on the print job data for a color in which a color shift has occurred based on the color shift amount in a verification target page one or a plurality of pages before when printing related to the print job data is performed, in which the color shift corrector 103 includes

- a first correction processor 103*a* that compensates for at least a part of the color shift amount by moving a formation position of the image forming region within the print target page in parallel in the sheet passing direction within a range of the margin region in a job of a color to be corrected of the print job data, and
- a second correction processor 103*b* that compensates for at least a part of the color shift amount by inserting an additional blank region having a second width that does not constitute a page between the print target page and an immediately preceding page in the job of the color to be corrected of the print job data, and the entirety of the color shift amount is compensated by the processing of the first correction processor 103*a* and the second correction processor 103*b*.

Thus, it is possible to cope with a color shift occurring during continuous printing while minimizing the blank region (that is, the margin region provided between the image forming region of the n-th page and the image forming region of the (n+1)-th page) provided between pages.

Note that, in the above embodiment, a mode has been described in which the color shift corrector 103 performs one of the correction processing of the first correction processor 103*a* or the correction processing of the second correction processor 103*b* in order to compensate for the color shift amount in the verification target page, but the color shift corrector 103 may perform both the correction processing of the first correction processor 103*a* and the correction processing of the second correction processor 103*b* in order to compensate for the color shift amount in the verification target page.

In other words, the color shift corrector 103 may allocate the color shift amount in the verification target page to a compensation amount by the first correction processor 103*a* and a compensation amount by the second correction processor 103*b*. In this case, since the resolution that can be compensated by the second correction processor 103*b* is every 1.0 Lines, typically, it is sufficient if a value obtained by subtracting the color shift amount that can be compensated by the second correction processor 103*b* from the color shift amount in the verification target page is compensated by the first correction processor 103*a*.

Modification 1

In the above embodiment, the mode has been described in which the color shift amount detector 102 always detects the color shift amount of the image formation position of another color with reference to the image formation position of K color. However, it is preferable that the color shift amount detector 102 expresses the color shift amount of the image formation position of another color with reference to the image formation position of the color formed at the rearmost part in the sheet passing direction among the colors without fixing the reference color.

Figure 12:
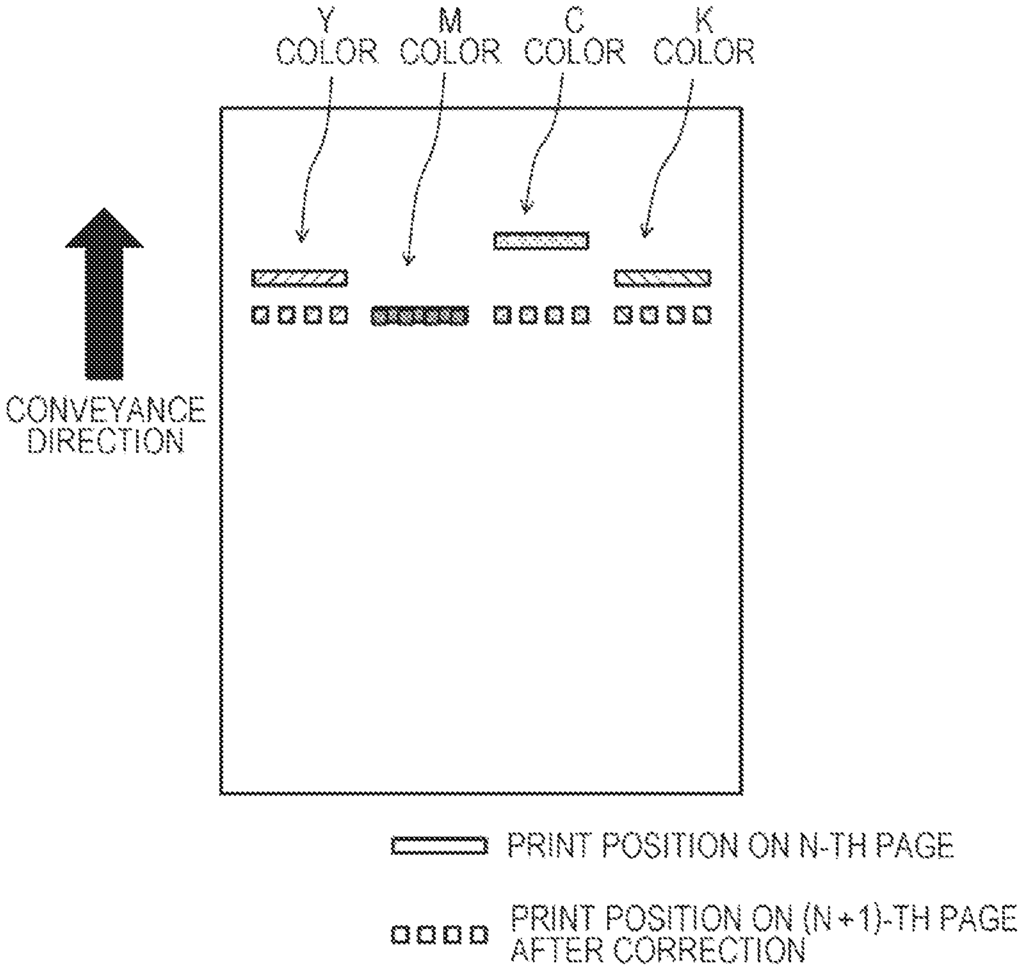
FIG. 12 is a diagram schematically illustrating processing of a color shift amount detector according to Modification 1.
Figure 13:
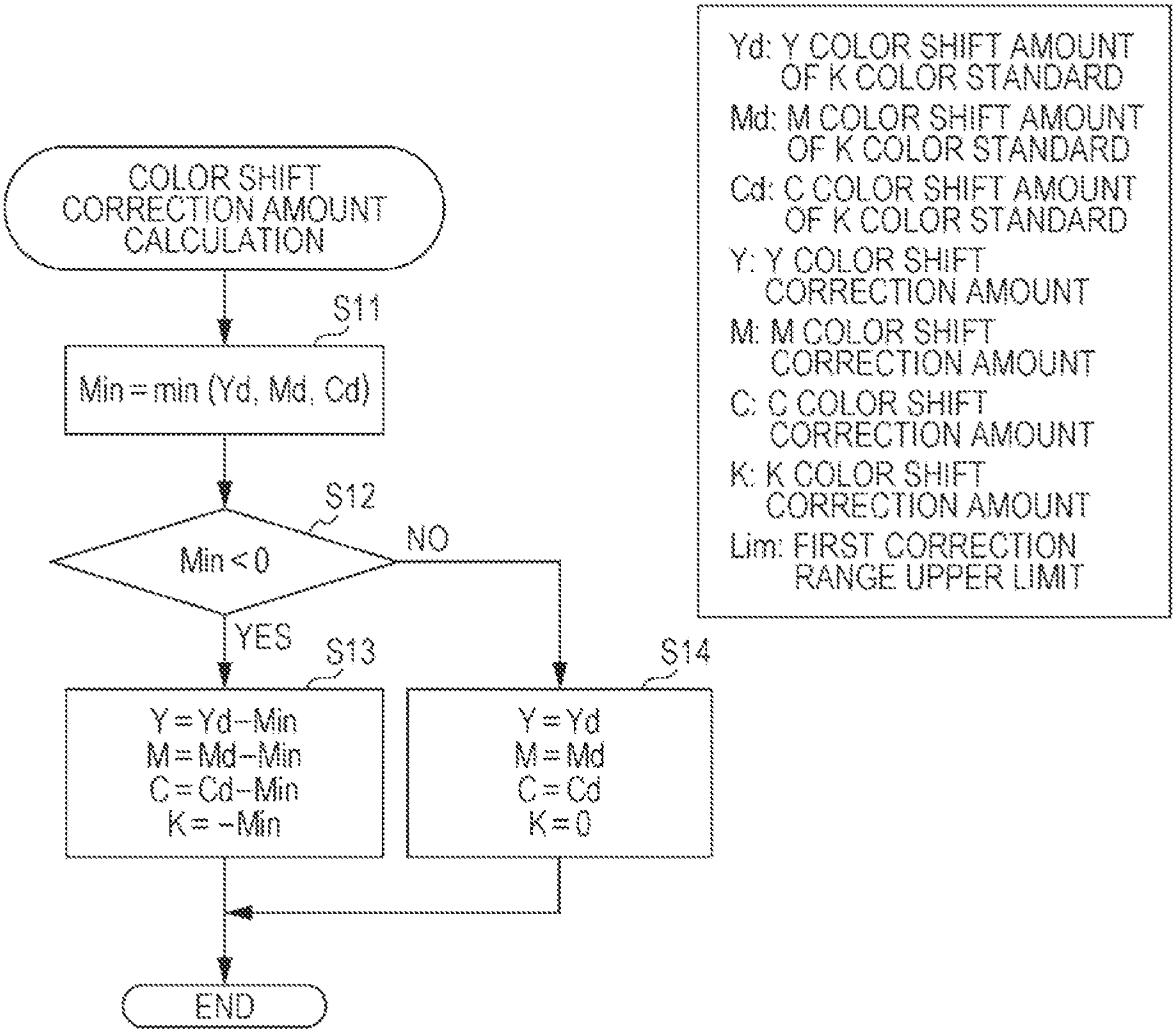
FIG. 13 is a flowchart describing an example of processing of a color shift amount detector according to Modification 1.

FIG. 12 is a diagram schematically illustrating processing of the color shift amount detector 102 according to Modification 1. FIG. 13 is a flowchart describing an example of processing of the color shift amount detector 102 according to Modification 1.

FIG. 12 illustrates a mode in which an M-color image formation position is formed at the rearmost part in the sheet passing direction on the N-th page. Here, if the image formation position of K color is used as a reference as in the above embodiment, the color shift of the image formation position of M color with respect to K color on the Nth page is expressed as a phase delay (that is, color shift in negative direction). However, the second correction processor 103*b* can perform only the correction processing for coping with the phase advance (that is, color shift in positive direction) (that is, only the shift to the rear side in the sheet passing direction can be performed). Thus, in such an expression method, it becomes impossible to compensate for the color shift of the image formation position of M color with respect to K color in the (N+1)-th page.

From such a viewpoint, when representing the color shift amount of the verification target page, it is preferable that the color shift amount detector 102 expresses the color shift amount of the image formation position of another color with reference to the image formation position (in FIG. 12, M color) of the color formed at the rearmost part in the sheet passing direction among the colors. That is, it is sufficient if another color is shifted backward in the sheet passing direction with reference to the color shifted rearmost for each page.

The flowchart of FIG. 13 is a processing procedure embodying such a technical idea.

In step S11, the color shift amount detector 102 first acquires the color shift amount Yd of Y color of the K color standard, the color shift amount Md of M color of the K color standard, and the color shift amount Cd of C color of the K color standard, and specifies the minimum value (Min=min (Yd, Md, and Cd)) among them.

In step S12, the color shift amount detector 102 determines whether or not the minimum value (Min=min (Yd, Md, and Cd)) specified in step S11 is smaller than zero. Then, when the minimum value min (Yd, Md, and Cd) specified in step S11 is smaller than zero (S12: YES), the color shift amount detector 102 advances the processing to step S13, and when the minimum value min (Yd, Md, and Cd) specified in step S11 is zero or more (S12: NO), the color shift amount detector advances the processing to step S14.

Here, a case where the minimum value min (Yd, Md, and Cd) specified in step S11 is smaller than zero (S12: YES) is a case where the color formed at the rearmost part in the sheet passing direction is not the K color, and a case where the minimum value min (Yd, Md, and Cd) specified in step S11 is zero or more (S12: NO) is a case where the color formed at the rearmost part in the sheet passing direction is the K color.

In step S13, the color shift amount detector 102 changes a color shift correction value of each color as follows in order to change the color used as the reference of the color shift to the color formed at the rearmost part in the sheet passing direction.

Correction value of Y color: Y=Yd−Min
Correction value of M color: M=Md−Min
Correction value of C color: C=Cd−Min
Correction value of K color: K=−Min In step S14, the color shift amount detector 102 does not need to change the reference color of the color shift from K color to another color, and thus determines the color shift correction value of each color as follows.

Correction value of Y color: Y=Yd
Correction value of M color: M=Md
Correction value of C color: C=Cd
Correction value of K color: K=0

As described above, by the image forming apparatus U according to the present modification, it is possible to execute the correction processing of the color shift corrector 103 so as to correspond to the color shifts of all the colors.

Modification 2

Figure 14:
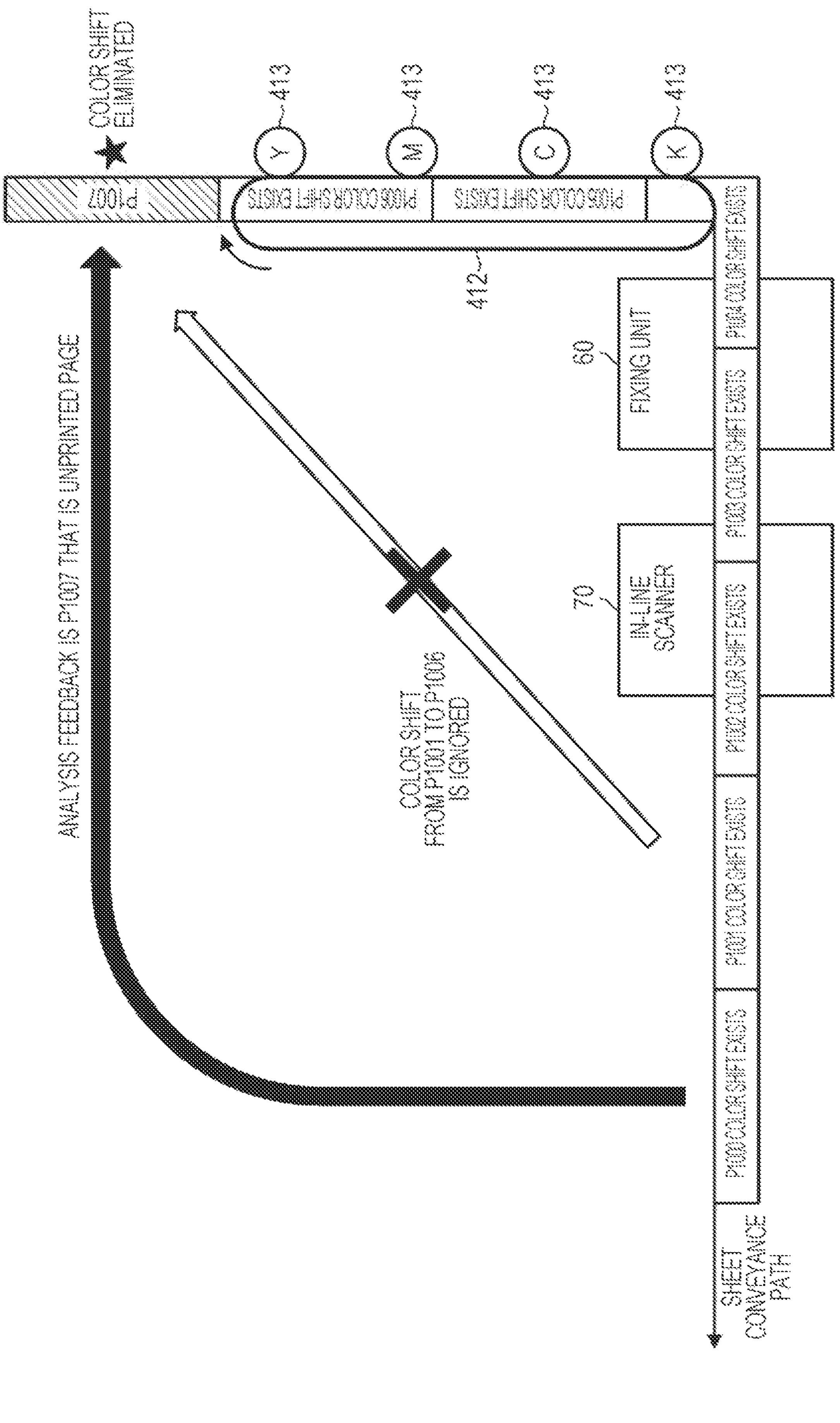
FIG. 14 is a diagram schematically illustrating color resist correction of an image forming apparatus according to Modification 2.

FIG. 14 is a diagram schematically illustrating color resist correction of the image forming apparatus U according to Modification 2.

Normally, when the print job data is corrected such that the color shift amount is detected by the color shift amount detector 102 (in-line scanner 70) and then fed back by the color shift corrector 103, a time lag occurs therebetween. For example, FIG. 14 illustrates that when the color shift is detected on page 1000 of the continuous paper P, the color resist correction corresponding to the color shift is performed and the color image is printed on page 1007, and the color images printed on pages 1001 to 1006 of the continuous paper P are in a state in which the correction of the color shift amount is not reflected.

In this state, on pages 1001 to 1006 of the continuous paper P, similarly, when the print job data is corrected such that the color shift amount is detected by the color shift amount detector 102 and then the color shift amount is fed back by the color shift corrector 103, the color shift amount is redundantly compensated.

Accordingly, the image forming apparatus U according to the present modification does not perform (that is, stops) the processing of the color shift amount detector 102 and/or the color shift corrector 103 in the time lag from detection of the color shift amount by the color shift amount detector 102 until completion of the correction processing of the print job data for compensating for the color shift amount by the color shift corrector 103. For example, in the aspect of FIG. 14, the image forming apparatus U according to the present modification does not perform the processing of the color shift amount detector 102 and the color shift corrector 103 on pages 1001 to 1006 of the continuous paper P.

The image forming apparatus U according to the present modification is useful in that overlapping correction can be avoided and color resist correction can be performed by an appropriate amount of color shift.

Modification 3

As described in Modification 2, a time lag occurs from detection of the color shift amount of the verification target page by the color shift amount detector 102 until completion of the correction processing of the print job data for compensating for the color shift amount by the color shift corrector 103 (that is, until a color image is formed on the continuous paper P in a state where the color shift amount is compensated).

In a case where this delay in the image forming apparatus U is on the order of several meters from the paper conveyance distance and the paper conveyance speed, a change in the internal temperature during the time lag can be ignored. However, in a case of a machine configuration in which the distance from the image formation position in the image former 40 to the in-line scanner 70 is several tens of meters or a machine configuration in which the change in the internal temperature is severe, the change in the internal temperature during the time lag cannot be ignored. In the case of such a machine configuration, it is only required to estimate and reflect the color shift amount to be newly generated until feedback from the difference between the internal temperature at the time of printing the color shift calculation page and the internal temperature at the time of feedback.

That is, in the image forming apparatus U according to the present modification, the color shift corrector 103 corrects the color shift amount detected by the color shift amount detector 102 based on the difference between the internal temperature of the image forming apparatus U at the time of image formation of the verification target page and the internal temperature of the image forming apparatus U at the time of image formation of the next print target page, so as to correspond to the change in the color shift amount in the time lag.

Note that the correspondence relationship between the difference between the internal temperature of the image forming apparatus U at the time of image formation of the verification target page and the internal temperature of the image forming apparatus U at the time of image formation of the next print target page and the correction amount for the color shift amount detected by the color shift amount detector 102 may be obtained in advance by experiment or simulation and stored in the storage unit (for example, the ROM 100*b*) as table data.

The image forming apparatus U according to the present modification is useful in that it can also cope with a change in the color shift amount in a time lag from detection of the color shift amount of the verification target page by the color shift amount detector 102 until completion of the correction processing of the print job data for compensating for the color shift amount by the color shift corrector 103.

Modification 4

When the difference between the internal temperature of the image forming apparatus U at the end of the print job and the internal temperature of the image forming apparatus U at the start of the next print job is equal to or less than a predetermined temperature, the color shift corrector 103 may start the next print job using the color shift amount at the end of the print job as the color shift amount of the first page of the next print job.

That is, the color shift amount at the end of the print job is reflected as the first page correction value of the next print job. Consequently, when the next print job is started, the time until the color shift measurement patch is printed on the intermediate transfer belt 421 and the color shift amount of each color is calculated can be reduced. However, in a case where a fixing heater is stopped by the end of printing and the internal temperature is lowered, the color shift amount changes, and thus it is necessary to correct the color shift again. Thus, it is preferable to apply the correction value to the next job only when being within a certain temperature change after the end of the print job.

The image forming apparatus U according to the present modification is useful in that the time for color shift correction processing at the start of the next print job can be reduced.

According to an embodiment of the present invention, with the image forming apparatus of the present disclosure, when printing is performed on continuous paper, it is possible to correct a color shift that occurs during continuous printing without widening a margin between pages.

Although embodiments of the present invention have been described and illustrated in detail, the disclosed embodiments are made for purposes of illustration and example only and not limitation. The scope of the present invention should be interpreted by terms of the appended claims. The technology described in the claims includes various modifications and changes of the specific examples exemplified above.

What is claimed is:

1. An image forming apparatus including an image former that forms a color image by superimposing images of respective colors formed on respective different photoconductors on an intermediate transfer body, the image former continuously forming color images of a plurality of pages on one continuous paper, the image forming apparatus comprising:

a first hardware processor that performs job management for each color and generates print job data in which a margin region having a first width is set on an upstream side or a downstream side in a sheet passing direction of an image forming region of each page;

a second hardware processor that detects, in units of pages, a color shift amount of each color of the image forming region generated while printing related to the print job data is performed; and a third hardware processor that corrects a formation position of the image forming region to be a print target page next on the print job data for a color in which a color shift has occurred based on the color shift amount in a verification target page one or a plurality of pages before when printing related to the print job data is performed, wherein the third hardware processor includes a first correction processor that compensates for at least a part of the color shift amount by moving a formation position of the image forming region within the print target page in parallel in the sheet passing direction within a range of the margin region in a job of a color to be corrected of the print job data, and a second correction processor that compensates for at least a part of the color shift amount by inserting an additional blank region having a second width that does not constitute a page between the print target page and an immediately preceding page in the job of the color to be corrected of the print job data, and an entirety of the color shift amount is compensated by processing of the first correction processor and the second correction processor.

2. The image forming apparatus according to claim 1, wherein the third hardware processor performs correction processing of the first correction processor and/or the second correction processor on the print job data in such a manner that a width of the margin region between the image forming region of the print target page and the image forming region of an immediately preceding page becomes equal to the first width when the images of the respective colors are superimposed on the intermediate transfer body.

3. The image forming apparatus according to claim 1, wherein a correctable range of the formation position of the image forming region by the first correction processor is a range of the margin region of each page.

4. The image forming apparatus according to claim 1, wherein the third hardware processor performs, in a case where an accumulated value of the color shift amount during a period from previous insertion of the additional blank region until a current correction timing has increased to be equal to or more than the first width, correction processing by the second correction processor, and performs, in a case where the accumulated value of the color shift amount during the period from previous insertion of the additional blank region until a current correction timing has not increased to be equal to or more than the first width, correction processing by only the first correction processor.

5. The image forming apparatus according to claim 1, wherein the second width of the additional blank region is a same width as the first width of the margin region.

6. The image forming apparatus according to claim 1, wherein the second hardware processor senses an internal temperature of the image forming apparatus with a temperature sensor, and detects the color shift amount based on data related to a correspondence relationship between the internal temperature of the image forming apparatus and the color shift amount set in advance.

7. The image forming apparatus according to claim 1, wherein the second hardware processor forms an image of a color shift measurement patch in a predetermined blank region set at a position shifted in a direction orthogonal to the sheet passing direction with respect to the image forming region in the continuous paper, and detects the color shift amount by sensing the image of the color shift measurement patch by an in-line scanner or a photosensor.

8. The image forming apparatus according to claim 1, wherein the second hardware processor expresses the color shift amount of the image formation position of another color with reference to the image formation position of a color formed at a rearmost part in the sheet passing direction among the colors.

9. The image forming apparatus according to claim 1, wherein processing of the second hardware processor and/or the third hardware processor is stopped in a time lag from detection of the color shift amount by the second hardware processor until completion of the correction processing of the print job data for compensating for the color shift amount by the third hardware processor.

10. The image forming apparatus according to claim 1, wherein the third hardware processor corrects the color shift amount detected by the second hardware processor based on a difference between an internal temperature of the image forming apparatus at a time of image formation of the verification target page and an internal temperature of the image forming apparatus at a time of image formation of the print target page, in such a manner as to correct an additional color shift from the color shift amount in a time lag from detection of the color shift amount by the second hardware processor until completion of the correction processing of the print job data for compensating for the color shift amount by the third hardware processor.

11. The image forming apparatus according to claim 1, wherein when a difference between the internal temperature of the image forming apparatus at an end of the print job and the internal temperature of the image forming apparatus at a start of a next print job is equal to or less than a predetermined temperature, the third hardware processor starts the next print job using the color shift amount at an end of the print job as the color shift amount of a first page of the next print job.

12. An image forming method for continuously forming color images of a plurality of pages on one continuous paper in an image former that forms a color image by superimposing images of respective colors formed on respective different photoconductors on an intermediate transfer body, the image forming method comprising:

performing job management for each color and generating print job data in which a margin region having a first width is set on an upstream side or a downstream side in a sheet passing direction of an image forming region of each page;

detecting, in units of pages, a color shift amount of each color of the image forming region generated while printing related to the print job data is performed; and correcting a formation position of the image forming region to be a print target page next on the print job data for a color in which a color shift has occurred based on the color shift amount in a verification target page one or a plurality of pages before when printing related to the print job data is performed, wherein in the correcting, an entirety of the color shift amount is compensated by performing compensating for at least a part of the color shift amount by moving a formation position of the image forming region within the print target page in parallel in the sheet passing direction within a range of the margin region in a job of a color to be corrected of the print job data, and compensating for at least a part of the color shift amount by inserting an additional blank region having a second width that does not constitute a page between the print target page and an immediately preceding page in the job of the color to be corrected of the print job data.

13. A non-transitory recording medium storing a computer readable image forming program for continuously forming color images of a plurality of pages on one continuous paper in an image former that forms a color image by superimposing images of respective colors formed on respective different photoconductors on an intermediate transfer body, the image forming program comprising:

performing job management for each color and generating print job data in which a margin region having a first width is set on an upstream side or a downstream side in a sheet passing direction of an image forming region of each page;

detecting, in units of pages, a color shift amount of each color of the image forming region generated while printing related to the print job data is performed; and correcting a formation position of the image forming region to be a print target page next on the print job data for a color in which a color shift has occurred based on the color shift amount in a verification target page one or a plurality of pages before when printing related to the print job data is performed, wherein in the correcting, an entirety of the color shift amount is compensated by performing compensating for at least a part of the color shift amount by moving a formation position of the image forming region within the print target page in parallel in the sheet passing direction within a range of the margin region in a job of a color to be corrected of the print job data, and compensating for at least a part of the color shift amount by inserting an additional blank region having a second width that does not constitute a page between the print target page and an immediately preceding page in the job of the color to be corrected of the print job data.

* * * * *